April 10, 1962     W. A. LEDWITH     3,028,729
ROCKET FUEL SYSTEM
Filed April 12, 1960
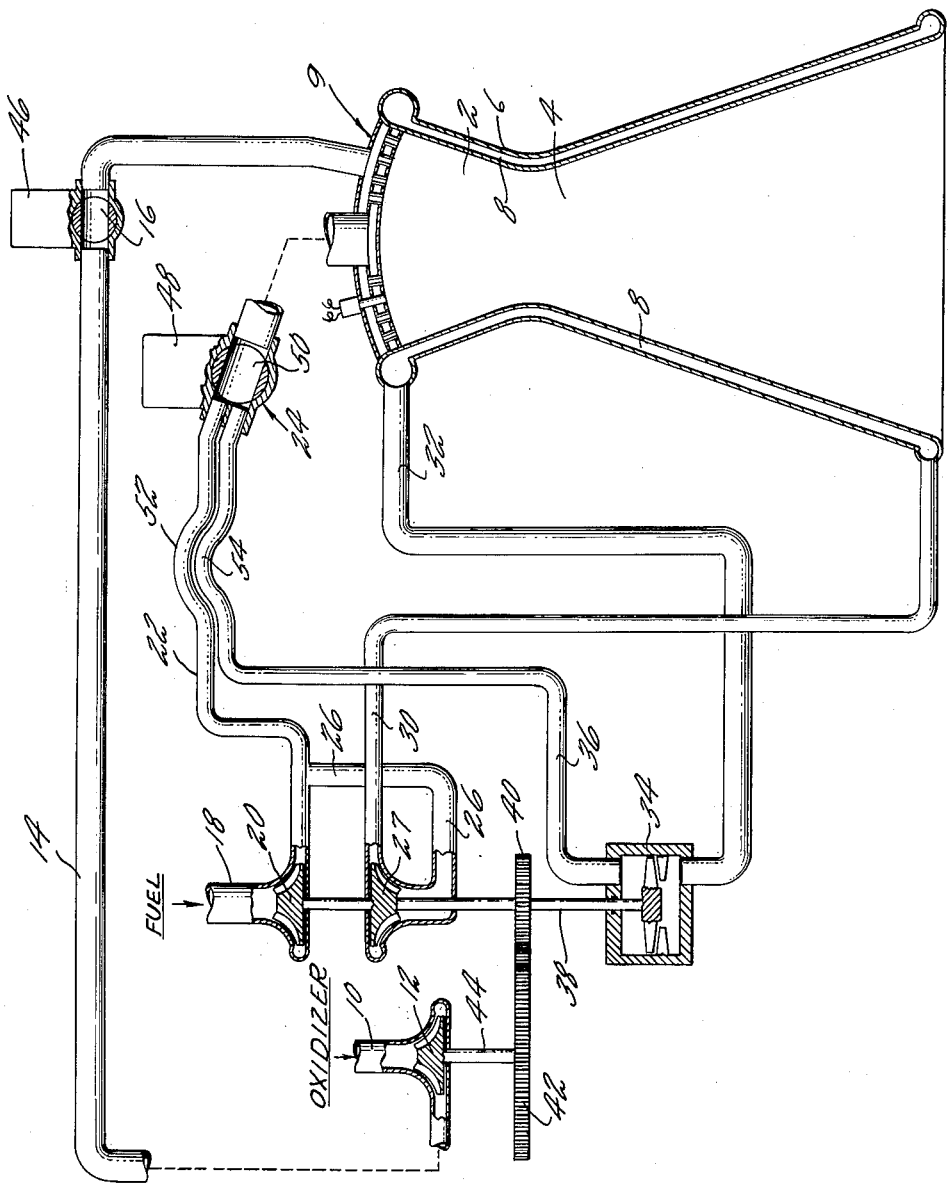
INVENTOR
WALTER A. LEDWITH
BY
ATTORNEY … # 3,028,729
ROCKET FUEL SYSTEM
Walter A. Ledwith, Glastonbury, Conn., assignor to United Aircraft Corporation, East Hartford, Conn., a corporation of Delaware
Filed Apr. 12, 1960, Ser. No. 21,833
11 Claims. (Cl. 60—35.6)

This invention relates to a propellant system for liquid propellant rockets.

In an expansion cycle rocket powerplant cryogenic fuel is heated in the nozzle cooling jacket and then expanded in a turbine to drive the propellant pumps. The energy available from the cooling of the nozzle limits the energy available in the turbine for pumping the propellants and thus the delivery pressure of the pumps is limited. One feature of this invention is a reduction in the energy required for driving the pumps for a selected size thereby permitting delivery of the propellants to the combustion chamber at a higher pressure. Another feature is an arrangement in a fuel system of a multistage pump for the cryogenic fuel with a part of the fuel pumped being delivered directly to the injector head from between successive pump stages with the remainder of the fuel passed through the remaining stages and thence the cooling jacket and through the turbine. This results in a substantial saving in turbine horsepower by necessitating raising only a part of the fuel to the full pressure of the multistage pump. The saving in turbine horsepower can be utilized for raising the pressure of the fuel going directly to the injector head to a higher pressure thereby permitting an increase in the effective pressure within the combustion chamber.

Since the energy available from the cooling jacket is a function of wall temperature and surface area and substantially independent of coolant flow rate, the flow of only one-half, for example, of the total flow through the jacket will be almost equally effective in cooling and will result in a delivery of substantially the same amount of energy to the turbine. Accordingly, one feature of the invention is a fuel system in which only a part of the fuel is raised to the high pressure necessary for delivery through the cooling jacket and the turbine and thence to the injector head with the remainder of the fuel delivered at substantially turbine exhaust pressure directly from the pump to the injector head. The resulting saving in pumping energy results in a new balance of available and required power, and permits the rocket engine to be designed to higher chamber pressure than that possible if the total flow is pumped through the cooling jacket. This higher chamber pressure reduces the size of the rocket engine for a given power output, or if the rocket engine is limited in maximum diameter at a given thrust, the higher chamber pressure permits using a higher expansion ratio nozzle with corresponding higher specific impulse.

Other features and advantages will be apparent from the specification and claims, and from the accompanying drawing which illustrates an embodiment of the invention.

The single FIGURE is a diagrammatic showing of the propellant system.

The propellant system is shown in connection with a rocket having a combustion chamber 2 and a nozzle 4, the nozzle and combustion chamber having a wall 6 with passages 8 therein for the flow of coolant therethrough. The rocket also has an injector head 9 forming one wall of the combustion chamber, this head providing for the admission of the propellants into the combustion chamber. The particular arrangement of the injector head is not critical; one example of an injector head is shown in the co-pending application of Ledwith et al., Serial No. 821,067, filed June 17, 1959.

The propellants used in the particular arrangement shown are an oxidizer (oxygen) and a fuel (hydrogen) although it will be understood that other suitable propellants may be used, one of the propellants in any event being a cryogenic fluid such as liquid hydrogen.

The oxidizer is supplied from a tank, not shown, through an inlet duct 10 to a pump 12 and thence through a conduit 14 past a control valve 16 to the injector head. The pump 12 will deliver the oxygen or oxidizer at a pressure sufficiently above the combustion chamber pressure so that the oxidizer will be discharged through suitable nozzles into the combustion chamber.

The other propellant in this case, liquid hydrogen, is delivered from a tank, not shown, through an inlet duct 18 to a first stage or low pressure pump 20. At the outlet of this pump, the hydrogen is divided into two parts, one conduit 22 delivering the hydrogen directly to a fuel control valve 24 and thence to the nozzles in the injector head. This pump 20 will deliver hydrogen at a pressure sufficiently higher than the pressure within the combustion chamber to assure a discharge of the fuel or propellant into the combustion chamber at the desired rate.

The remainder of the fuel from the pump 20 is delivered through a branch conduit 26 to the second stage or high pressure pump 27 which together with the pump 20 forms a multistage pump. From the delivery side of the pump 27 a conduit 30 conveys the liquid hydrogen to the coolant passages 8 in the wall 6. From the wall 6 a conduit 32 delivers the liquid hydrogen at a substantially higher temperature than the hydrogen in the conduit 30 to a turbine 34. From the turbine the hydrogen is conveyed by a conduit 36 to the fuel valve 24 and thence to the injector head. The pressure in the turbine discharge conduit 36 and the pressure in the conduit 22 are substantially the same to assure a discharge of hydrogen from both of these conduits past the valve 24 and through the injector head.

The rotor for turbine 34 is carried on a shaft 38 which also carries the pumps 20 and 27 so that these hydrogen pumps are driven from the turbine. A gear 40 on the shaft 38 meshes with the gear 42 on the shaft 44 for the oxidizer pump 12 so that this pump is also driven from the turbine. The oxidizer and fuel valves 16 and 24 are opened by suitable controls 46 and 48 when the engine is to be put in operation. The mechanism for opening or closing these valves is not a part of the present invention and is described in co-pending application of Abild, Serial No. 21,831 filed April 12, 1960.

The fuel valve 24 is preferably of the type shown such that the movable valve element 50 may be turned to cut off the flow through the conduit 22 from the first stage pump although allowing flow through the conduit 36 to the injector head. This arrangement facilitates starting of the fuel system since it allows the total output of hydrogen under pressure from the multistage pumps to be delivered through the nozzle wall and thence through the turbine when the system is being started. The overall starting system is disclosed in detail in the co-pending Abild application Serial No. 21,831, above identified.

For the purpose of the present application, opening of the fuel valve 24 to admit fuel from the conduit 36 to the injector head permits a flow of hydrogen under the influence of gravity through the system, the tanks for the hydrogen being above the system. The normal temperatures existing in the rocket wall and in the conduits 30 and 32 before starting will heat the hydrogen as it passes therethrough sufficiently so that some heat energy can be extracted by the hydrogen to drive the turbine for the propellant pumps. As soon as the propellants, in a small quantity, reach the combustion chamber they are ignited thereby adding additional heat to the nozzle wall and increasing the temperature of the hydrogen in the conduit 32 until the turbine is operating at designed power and the system is in normal operation at wihch time the valve 24 will be in the fully open position shown. It will be understood that this starting takes place in a very short interval of time, being a matter of only a few seconds until the system is operating normally.

The vertically arranged hump 52 in the conduit 22 and the hump 54 in the conduit 36 represent vapor traps which will prevent any vapor forming in the conduits 22 or 36 downstream of the vapor trap during nonoperation of the device from passing upstream and into the propellant tanks.

It is to be understood that the invention is not limited to the specific embodiment herein illustrated and described, but may be used in other ways without departure from its spirit as defined by the following claims.

I claim:

1. A fuel system for a rocket having a nozzle wall cooled by one of the propellants and an injector head through which the propellants are delivered to the combustion chamber, said system including a multistage pump for one propellant, a second pump for a second propellant, a turbine drive for both of said pumps, means for conducting propellant from the second pump to the injector head, means for conducting said one propellant from the last stage of the multistage pump to the nozzle wall for cooling it, a fuel connection from said nozzle wall to the turbine drive, a fluid connection from said turbine drive to the injector head, and another fluid connection from said multistage pump between successive stages directly to said injector head.

2. A fuel system as in claim 1 in which the said fluid connections from said turbine drive to said head and from said multistage pump between successive stages to the injector head are combined before reaching said injector head.

3. A fuel system as in claim 1 in which valves are provided in the fluid connections to the injector head.

4. A fuel system as in claim 2 in which a valve is provided for the combined fluid connections.

5. A fuel system as in claim 2 in which a valve is provided by which to close off the fluid connection from between successive stages.

6. A fuel system for a rocket having an injector head and a nozzle wall with passages therein for a coolant, the system including an oxidizer supply, a pump for delivering oxidizer to said injector head, a fuel supply, a two-stage pump including a low pressure stage and a high pressure stage for delivering fuel to said rocket, a connection from the delivery side of the low pressure stage directly to said injector head for delivery of a part of the fuel from said low pressure stage to the injector head, a connection from the delivery side of said low pressure stage to the inlet of the high pressure stage for the remainder of the fuel from the low pressure stage, a fluid connection from the delivery side of the high pressure stage to the coolant passages in the nozzle wall and a connection from the coolant passages to the injector head.

7. A fuel system as in claim 6 in which a turbine drives the pumps and in which the turbine is located in the fluid connection from the coolant passages to the injector head.

8. A fuel system as in claim 6 in which the fuel connections to the injector head have valving therein by which to close off the connection from the delivery of the low pressure stage.

9. A fuel system for a rocket having a nozzle wall cooled by a propellant and an injector head through which the propellant is delivered to the combustion chamber, said system including a multistage pump for the propellant, a turbine connected to the pump for driving it, means for conducting the pump from the last stage of the multistage pump to the nozzle wall for cooling it, a fluid connection from said nozzle wall to the turbine to power the turbine with said heated propellant, a fluid connection from said turbine to the injector head for delivering the turbine discharge to the injector head and another fluid connection from said pump between successive stages directly to said injector head.

10. A fuel system as in claim 9 in which the said fluid connections from said turbine to said head and from said multistage pump between successive stages to the injector head are combined before reaching said injector head.

11. A fuel system as in claim 9 in which a valve is provided by which to close off the fluid connection from between successive stages.

References Cited in the file of this patent

UNITED STATES PATENTS

| | | |
|---|---|---|
| 2,483,045 | Harby | Sept. 27, 1949 |
| 2,625,007 | Traux | Jan. 13, 1953 |